(12) United States Patent
Wang et al.

(10) Patent No.: US 7,887,668 B2
(45) Date of Patent: Feb. 15, 2011

(54) AMINE ORGANOBORANE POLYMERIZABLE COMPOSTION AND USES THEREFOR

(75) Inventors: Yee Y. Wang, Novi, MI (US); Barbara J. Walter, Harper Woods, MI (US)

(73) Assignee: Dow Global Technologies Inc., Midland, MI (US)

( * ) Notice: Subject to any disclaimer, the term of this patent is extended or adjusted under 35 U.S.C. 154(b) by 766 days.

(21) Appl. No.: 11/842,577

(22) Filed: Aug. 21, 2007

(65) Prior Publication Data

US 2008/0053613 A1 Mar. 6, 2008

Related U.S. Application Data

(60) Provisional application No. 60/823,950, filed on Aug. 30, 2006.

(51) Int. Cl.
*C04B 37/00* (2006.01)
*C09J 4/00* (2006.01)
*C09J 101/00* (2006.01)
*C09J 201/00* (2006.01)
*B32B 27/00* (2006.01)

(52) U.S. Cl. ................................. 156/325; 156/331.1
(58) Field of Classification Search .................. 156/325, 156/331.1
See application file for complete search history.

(56) References Cited

U.S. PATENT DOCUMENTS 3,275,611 A 9/1966 Mottus et al.
4,714,730 A 12/1987 Briggs et al.
4,942,201 A 7/1990 Briggs et al.
5,106,928 A 4/1992 Skoultchi et al.
5,143,884 A 9/1992 Skoultchi et al.
5,206,288 A 4/1993 Gosiewski et al.
5,286,821 A 2/1994 Skoultchi et al.
5,539,070 A 7/1996 Zharov et al.
5,681,910 A 10/1997 Pocius
5,686,544 A 11/1997 Pocius
5,718,977 A 2/1998 Pocius
5,883,208 A 3/1999 Deviny
6,543,404 B2 4/2003 Jones et al.
6,706,831 B2 3/2004 Sonnenschein et al.
6,710,145 B2 3/2004 Sonnenschein et al.
6,713,578 B2 3/2004 Sonnenschein et al.
6,713,579 B2 3/2004 Sonnenschein et al.
6,730,759 B2 5/2004 Sonnenschein et al.
6,739,302 B2 5/2004 Jones et al.
6,740,716 B2 5/2004 Webb et al.
6,762,260 B2 7/2004 Sonnenschein et al.
6,777,512 B1 8/2004 Sonnenschein et al.

(Continued)

FOREIGN PATENT DOCUMENTS

WO       03/038006 A1    5/2003

OTHER PUBLICATIONS

PCT/US00/33806, published as WO 2001/044311.

(Continued)

*Primary Examiner*—Philip C Tucker
*Assistant Examiner*—Michael N Orlando
(74) *Attorney, Agent, or Firm*—Dobrusin & Thennisch PC

(57) ABSTRACT

An amine organoborane polymerizable composition and uses for the composition are disclosed. Also disclosed are assemblies and methods of forming those assemblies using the polymerizable composition as an adhesive.

15 Claims, 3 Drawing Sheets

U.S. PATENT DOCUMENTS

| | | |
|---|---|---|
| 6,806,630 B2 | 10/2004 | Birecki et al. |
| 6,825,298 B2 | 11/2004 | Sonnenschein et al. |
| 6,860,010 B2 | 3/2005 | Jones et al. |
| 6,949,603 B2 | 9/2005 | Sonnenschein et al. |
| 6,997,515 B2 | 2/2006 | Gupta et al. |
| 7,213,560 B2 | 5/2007 | Jones et al. |
| 7,475,664 B2 | 1/2009 | Jones et al. |
| 2002/0025381 A1* | 2/2002 | Sonnenschein et al. .. 427/372.2 |
| 2002/0144808 A1 | 10/2002 | Jones |
| 2003/0138651 A1* | 7/2003 | Kendall et al. ............. 428/506 |
| 2004/0160089 A1 | 8/2004 | Gupta et al. |
| 2004/0231628 A1* | 11/2004 | Jones et al. ............ 123/184.61 |
| 2005/0004332 A1 | 1/2005 | Jialanella et al. |
| 2005/0137370 A1* | 6/2005 | Jialanella et al. ............ 526/227 |
| 2006/0051605 A1 | 3/2006 | Wang et al. |
| 2006/0266476 A1 | 11/2006 | Sehanobish et al. |
| 2007/0277926 A1 | 12/2007 | Naughton et al. |
| 2008/0090981 A1 | 4/2008 | Jialanella et al. |

OTHER PUBLICATIONS

CIBA, IRGASTAB FS 301, Product Information Sheet, published in 2000.
BASF, Palatinol 711P, Technical Data Sheet, Oct. 1996.
CYTEC, Cyanox STDP antioxidant, Technical Information Sheet.
Ethanox 330, p. 14.
DOW, UCAR VMCA Solution Vinyl Resin, Product Information Sheet, Jun. 2005.
Technical Data Sheet for BETAMATE 73332-73333.
Technical Data Sheet for BETAPRIME 4101, Jul. 19, 2001.
DUPONT DOW, Hypalon, Technical Information Sheet, Rev. 4, Nov. 2003.
DUPONT DOW, Hypalon, Material Safety Data Sheet, Jun. 13, 2003.
PCT/US2007/076479, International Search Report, dated Dec. 12, 2007, published as WO2008/027763.
Copending U.S. Appl. No. 61/092,934, filed Aug. 29, 2008.
Copending U.S. Appl. No. 12/033,447, filed Feb. 19, 2008.

* cited by examiner

AMINE ORGANOBORANE POLYMERIZABLE COMPOSTION AND USES THEREFOR

CLAIM OF PRIORITY

This application claims priority from U.S. Provisional application Ser. No. 60/823,950 filed Aug. 30, 2006.

TECHNICAL FIELD

The present invention relates to an amine organoborane polymerizable composition and uses for the composition. More particularly, the present invention relates to an amine organoborane polymerizable composition and its use as an adhesive for plastic substrates.

BACKGROUND OF THE INVENTION

The invention relates to an organoborane polymerizable composition and uses of the composition. Examples of organoborane polymerizable compositions and their uses are disclosed in U.S. Pat. Nos. 6,949,603; 6,825,298; 6,806,630; 6,777,512; 6,762,260; 6,740,716; 6,730,759; 6,713,579; 6,713,578; 6,710,145; and 6,706,831, all of which are incorporated herein by reference for all purposes and which are particularly incorporated for disclosing additional ingredients and additional uses suitable for the composition of the present invention. While it is generally contemplated that the organoborane polymerizable composition of the present invention can be used for multiple purposes, the composition of the present invention has been found particularly useful as an adhesive.

Adhesives can be used to adhere to a wide variety of different surfaces. However, different surfaces can provide difficulties for the ability of the adhesives to bond to those surfaces. For example, adhesives that are used to adhere to contoured surfaces (e.g., arcuate, angled, corned or otherwise contoured surfaces) can encounter difficulties relative to adhesives that are used to adhere to flat or planar surfaces. Moreover, the materials that surfaces are formed of can provide difficulties. For example, polymeric materials such as thermoplastics can provide surfaces that have relatively low surfaces energies and such surfaces can be particularly difficult to bond to. Thus, the present invention provides an organoborane polymerizable composition that can adhere to contoured surfaces and/or which can adhere to the relatively low energy surfaces.

SUMMARY OF THE INVENTION

The present invention provide an adhesive composition and a method of adhering a first mating surface to a second mating surface with the adhesive composition. According to the method, a resin part and a hardener part are provided for forming the adhesive composition. The resin part typically has a viscosity of at least about 120,000 cp and less than about 350,000 cp and the hardener part typically has a viscosity of at least about 90,000 cp and less than about 230,000 cp. The resin part and the hardener part are combined to form an adhesive polymerizable composition. The adhesive composition typically includes an organoborane/amine complex and/or a phthalate plasiticizer. The adhesive composition is contacted with the first surface and the second surface and allowed to polymerize and bond to the first surface and the second surface thereby forming a joint between the first surface and the second surface.

According to one additional or alternative aspect of the invention, the first surface, the second surface or both can be formed of a thermoplastic such as a filled or unfilled nylon. According to another additional or alternative aspect of the invention the method can include coating the first surface, the second surface or both with a primer prior to contacting the polymerizable composition with the first surface and the second surface. According to another additional or alternative aspect of the invention the composition can include heat stabilizer that includes antioxidant selected from hindered phenol, propionate, thioester or a combination thereof. According to another additional or alternative aspect of the invention, the first surface, the second surface or both is a contoured surface that includes the intersection of first surface portion and second surface portion wherein the first surface portion is disposes at an angle relative to the second portion of between about 45 degrees and about 135 degrees. According to another additional or alternative aspect of the invention, the polymerizable composition includes at least about 2% PMMA upon contacting the first surface, the second surface or both. According to another additional or alternative aspect of the invention, the first surface is provided by a first member of an engine intake manifold assembly and the second surface is provided by a second member of an engine intake manifold assembly. Other aspect of the invention will become apparent upon reading the detailed description of the invention.

DETAILED DESCRIPTION OF THE PREFERRED EMBODIMENT

Figure 1:
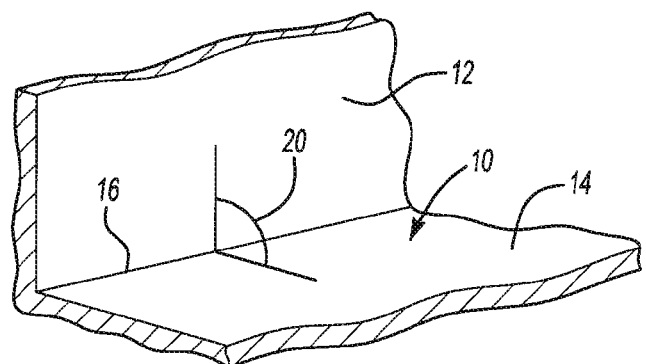
FIG. 1 is a perspective view of a portion of an exemplary contoured surface that can be bonded by the polymerizable composition of the present invention.
Figure 2:
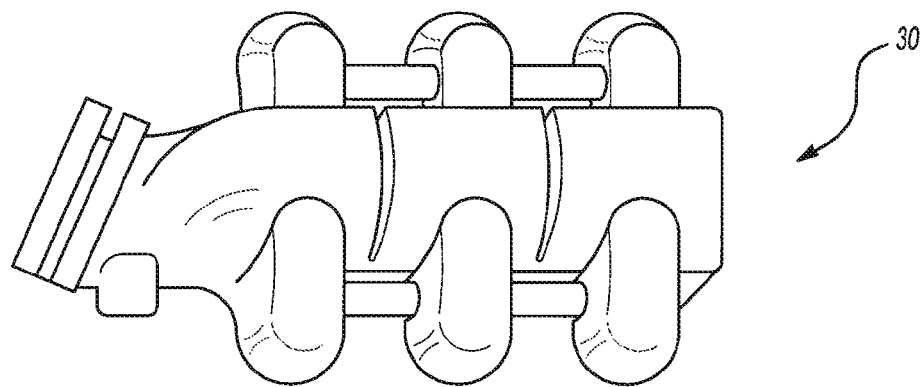
FIG. 2 is a perspective view of an exemplary intake manifold assembly in accordance with an aspect of the present invention.
Figure 3:
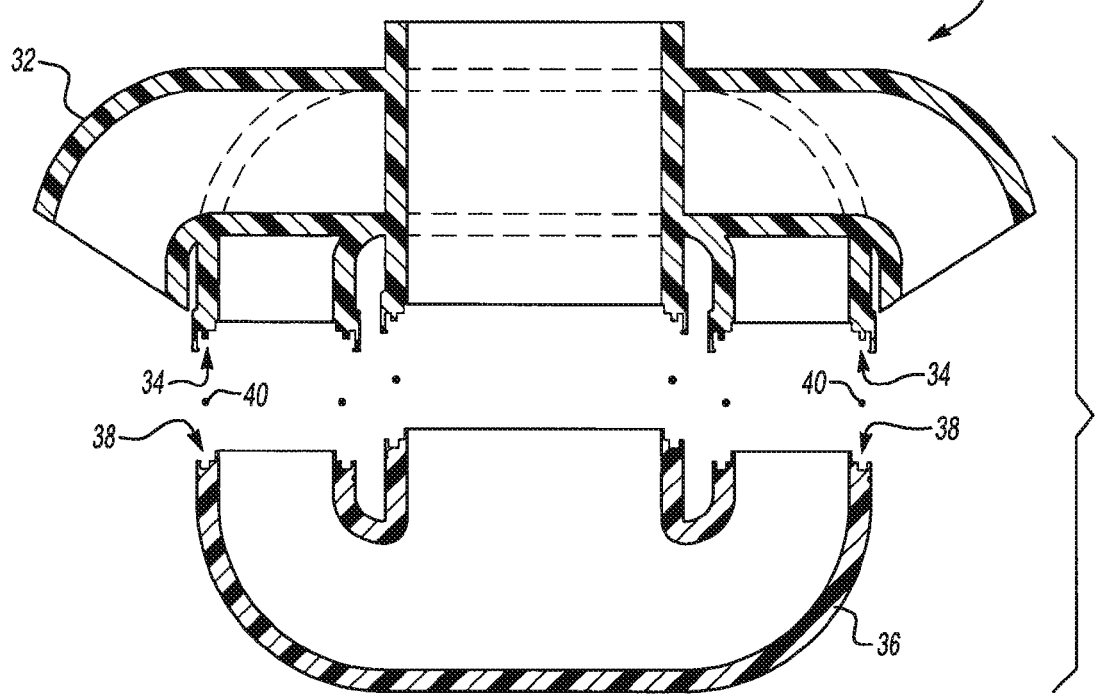
FIG. 3 is a sectional view of an exemplary intake manifold assembly in accordance with an aspect of the present invention.

The present invention is predicated upon the provision of an amine organoborane polymerizable composition and its uses. The composition has been found to be particularly effective as an adhesive used for bonding to one or more plastic surfaces, low energy surfaces or both. The composition has also been found to be effective in bonding to contoured surfaces.

The composition can be a one part adhesive or a two part adhesive and can be used for bonding to flat or contoured surfaces. In one embodiment, the composition is a two part, organoborane/amine complex adhesive, which can be advantageously employed for adhesive bonding to contoured surfaces due to flow properties of the adhesive.

The polymerizable composition will typically comprise one or more of the following:

i) an organoborane/amine complex;

ii) one or more of monomers, oligomers or polymers having olefinic unsaturation which is capable of polymerization by free radical polymerization; and, optionally iii) a compound which causes the said complex to disassociate so as to release the borane to initiate polymerization of one or more of monomers, oligomers or polymers having olefinic unsaturation.

The amines used to complex the organoborane compound can be any amines which complex the organoborane and which can be decomplexed when exposed to a decomplexing agent. Preferred amines include the primary or secondary amines or polyamines containing primary or secondary amine groups, or ammonia, as disclosed in Zharov U.S. Pat. No. 5,539,070 at column 5 lines 41 to 53, incorporated herein by reference, Skoultchi U.S. Pat. No. 5,106,928 at column 2 line 29 to 58 incorporated herein by reference, and Pocius U.S. Pat. No. 5,686,544 column 7, line 29 to Column 10 line 36 incorporated herein by reference; monthanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7 line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more groups of carboxylic acids, carboxylic acid esters, carboxylic acid halides, aldehydes, epoxides, alcohols and acrylate groups. Preferred amines include n-octylamine, 1,6-diaminohexane (1,6-hexane diamine), diethylamine, dibutyl amine, diethylene triamine, dipropylene diamine, 1,3-propylene diamine(1, 3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamine, polypropyleneoxide diamine, triethylene glycol propylene diamine, polytetramethyleneoxide diamine and polyethyleneoxidecopolypropyleneoxide diamine.

In particular, the amine in the organoborane/amine complex is suitably selected from the group of amines having an amidine structural component; aliphatic heterocycles having at least one nitrogen in the heterocyclic ring wherein the heterocyclic compound may also contain one or more nitrogen atoms, oxygen atoms, sulphur atoms, or double bonds in the heterocycle; primary amines which in addition have one or more hydrogen bond accepting groups wherein there are at least two carbon atoms, preferably at least three carbon atoms, between the primary amine and the hydrogen bond accepting group, such that due to inter- or intramolecular interactions within the complex the strength of the B—N bond is increased; and conjugated imines.

Preferred hydrogen bond accepting groups include the following: primary amines, secondary amines, tertiary amines, ethers, halogens, polyethers or polyamines. Heterocycle as used herein refers to a compound having one or more aliphatic cyclic rings of which one of the rings contains nitrogen. The amidines or conjugated imines may be straight or branched chain or cyclic.

Desirably, the organoborane used in the complex is a trialkyl borane or an alkyl cycloalkyl borane. Preferably this borane corresponds to Formula 1:

 Formula 1 wherein B represents boron; and $R^1$ is separately in each occurrence a $C_{1-10}$ alkyl, $C_{3-10}$ cycloalkyl, or two or more of $R^1$ may combine to form a cycloaliphatic ring.

Preferably $R^1$ is $C_{1-4}$ alkyl, even more preferably $C_{2-4}$ alkyl and most preferably $C_{3-4}$ alkyl. Among preferred organoboranes are tri-ethyl borane, tri-isopropyl borane and tri-n-butylborane.

In a preferred embodiment, the amine part of the complex comprises a compound having a primary amine and one or more hydrogen bond accepting groups, wherein there are at least two carbon atoms, preferably at least about three, between the primary amine and hydrogen bond accepting groups.

Preferably, the amine corresponds to Formula 2:

$$NH_2(CH_2)_b(C(R^2)_2)_aX \qquad (2)$$

wherein $R^2$ is separately in each occurrence hydrogen or a $C_{1-10}$ alkyl or $C_{3-10}$ cycloalkyl; X is hydrogen bond accepting moiety; a is an integer of 1 to 10; and b is separately in each occurrence an integer of 0 to 1, and the sum of a and b is from 2 to 10.

Preferably $R^2$ is hydrogen or methyl.

Preferably X is separate in each occurrence a hydrogen accepting moiety and, when the hydrogen accepting moiety is an amine, it is preferably a tertiary or a secondary amine. More preferably X is separately in each occurrence —$N(R^2)_e$, —$OR_{10}$, or a halogen wherein $R_8$ is separately in each occurrence $C_{1-10}$ alkyl, $C_{3-10}$ cycloalkyl or —$(C(R^2)_2)_d$—W; $R_{10}$ is separately in each occurrence, $C_{1-10}$ alkyl, $C_{3-10}$ cycloalkyl, or —$(C(R^2)_2)_d$—W; and e is 0, 1, or 2. More preferably X is —$N(R_8)_2$ or —$OR_{10}$.

Preferably, $R_8$ and $R_{10}$ are $C_{1-4}$ alkyl or —$(C(R^1)_2)_d$—W, more preferably $C_{1-4}$ alkyl and most preferably methyl. W is separately in each occurrence hydrogen or $C_{1-10}$ alkyl or X and more preferably hydrogen or $C_{1-4}$ alkyl.

Preferably, a is about 1 or greater and more preferably 2 or greater. Preferably, a is about 6 or less, and most preferably about 4 or less. Preferably, b is about 1. Preferably, the sum of a and b is an integer about 2 or greater and most preferably about 3 or greater. Preferably the sum of a and b are about 6 or less and more preferably about 4 or less. Preferably d is separately in each occurrence an integer of 1 to 4, more preferably 2 to 4, and most preferably 2 to 3.

Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated)ether), aminopropylmorpholine, isophoronediamine, and aminopropylpropanediamine.

In another embodiment, the amine may be an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has a nitrogen in the ring. Preferred compounds of this type include morpholine, piperidine, pyrolidine, piperazine, 1,3,3 trimethyl 6-azabicyclo[3,2,1] octane, thiazolidine, homopiperazine, aziridine, 1,4-diazabicylo[2.2.2]octane (DABCO), 1-amino-4-methylpiperazine, and 3-pyrroline.

In yet another embodiment, the amine which is suitably complexed with the organoborane is an amidine. Any compound with amidine structure wherein the amidine has sufficient binding energy as described hereinbefore with the organoborane, may be used. Among preferred amidines are 1,8 diazabicyclo[5,4]undec-7-ene; tetrahydropyrimidine; 2-methyl-2-imidazoline; and 1,1,3,3-tetramethylguanidine.

In a further embodiment, the amine which is complexed with the organoborane is suitably a conjugated imine. Any compound with a conjugated imine structure, wherein the imine has sufficient binding energy with the organoborane as described in International Patent Application No. PCT/US00/33806 may be used. The conjugated imine can be a straight or branched chain imine or a cylic imine. Among preferred conjugated imines are 4-dimethylaminopyridine; 2,3-bis(dimethylamino)cyclopropeneimine; 3-(dimethylamine)acroleinimine; 3-(dimethylamino)methacrole-inimine.

Preferably the molar ratio of amine compound to organoborane compound is from 1.0:1.0 to 3.0:1.0. Below the ratio of about 1.0:1.0 there may be problems with polymerization, stability of the complex and adhesion. Greater than about a 3.0:1.0 ratio may be used although there may not be additional benefit from using a ratio greater than about 3.0:1.0. If too much amine is present, this may negatively impact the stability of the adhesive or polymer compositions. Preferably the molar ratio of amine compound to organoborane compound is from 2.0:1.0 to 1.0:1.0.

The organoborane amine complex may be readily prepared using known techniques, for example as described or referred to in International Patent Application No. PCT/US00/33806.

Preferably, the polymerizable material comprises acrylate and/or methacrylate based compounds. Especially preferred acrylate and methacrylate compounds include methylmethacrylate, butylmethacrylate, ethylhexylmethacrylate, isobornylmethacrylate, tetrahydrofurfuryl methacrylate, and cyclohexylmethylmethacrylate.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Among preferred classes of compounds containing olefinic unsaturation are monomers, oligomers, polymers and mixtures thereof derived from the acrylates and methacrylates; olefinically unsaturated hydrocarbons, for example ethylene, propylene, butylene, isobutylene, 1-octene, 1-dodecene, 1-heptadecene, 1-eicosene and the like; vinyl compounds such as styrene, vinyl pyridine, 5-methyl-2-vinylpyridine, vinyl napthylene, alpha methylstyrene; vinyl and vinylidiene halides; acrylonitrile and methacrylonitrile; vinyl acetate and vinyl propionate; vinyl oxyethanol; vinyl trimethylacetate; carboxyl-modified vinyl chloride/vinyl acetate copolymer (VMCA); vinyl hexonate; vinyl laurate; vinyl chloroacetate; vinyl stearate; methyl vinyl ketone; vinyl isobutyl ether; vinyl ethyl ether; compounds that have a plurality of ethylenic bonds such as those having conjugated double bonds such as butadiene, 2-chlorobutadiene, isoprene; and the like. Examples of preferable acrylates and methacrylates are disclosed in Skoultchi, U.S. Pat. No. 5,286,821 at column 3, lines 50 to column 6, line 12, incorporated herein by reference and Pocius, U.S. Pat. No. 5,681,910 at column 9, line 28 to column 12, line 25, incorporated herein by reference. More preferred olefinic compounds include methyl acrylate, methylmethacrylate, butylmethacrylate, tert-butylmethacrylate, 2-ethylhexyacrylate, 2-ethylhexylmethacrylate, ethylacrylate, isobornylmethacrylate, isobomylacrylate, hydroxyethylmethacrylate, glycidylmethacrylate, tetrahydrofurfuryl methacrylate, acrylamide, n-methylacrylamide, and other similar acrylate containing monomers. Also useful are the class of acrylate tipped polyurethane prepolymers available commercially from several sources, and prepared by reacting an isocyanate reactive acrylate monomer, oligomer or polymer, such as a hydroxy acrylate, with an isocyanate functional prepolymer. Also useful in these compositions are acrylate crosslinking molecules including ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, isobomylmethacrylate and tetrahydrofurfuryl methacrylate.

Also potentially useful in compositions of the present invention is the class of acrylate and methacrylate tipped siloxane materials that can crosslink the acrylate and siloxane phases produced in this invention. Examples of such materials are (acryloxypropyl)trimethoxysiloxane and (methacryloxypropyl)trimethoxysiloxane, available from Shinitsu Silicones, acryloxy and methacryloxypropyl terminated polydimethylsiloxane, and (acryloxypropyl) and (methacrylcoxypropyl)methylsiloxane-dimethylsiloxane copolymer available from Gel-est (Tullytown, Pa.).

In the embodiment where the composition is used as an adhesive, acrylate and/or methacrylate based compounds are preferably used. The most preferred acrylate and methacrylate compounds include methylmethacrylate, butylmethacrylate, 2-ethylhexylmethacrylate, and cyclohexylmethylmethacrylate. Preferred amounts of acrylic monomer (acrylate and/or methacrylate based compounds) are preferably about 10 percent by weight or greater based on the total formulation weight, more preferably about 20 percent by weight or greater and most preferably about 30 percent by weight or greater. Preferred amounts of acrylic monomer (acrylate and/or methacrylate based compounds) are preferably about 90 percent by weight or less based on the total formulation weight, more preferably about 85 percent by weight or less and most preferred 80 percent by weight or less.

In a preferred embodiment, the polymerizable composition includes an effective amount of polymethylmethacrylate (PMMA). The PMMA is preferably a neat polymer and/or a hompolymer that includes less than about 5%, more typically less that about 2% and even more typically less than about 1% by weight of any copolymer and/or comonomer. When used, the PMMA is typically at least about 0.5%, more typically at least about 1.5% and even more typically at least about 2.5% and is typically less than about 15%, more typically less than about 7% and even more typically less than about 3.5% by weight of the polymerizable composition. The molecular weight of the polymethylmethacrylate is typically at least about 100,000 amu, although possibly lower, more typically at least 200,000 amu and still more typically at least 250,000 amu and is typically less than about 500,000 amu, although possibly higher, more typically less than about 400,000 amu and still more typically less than about 350,000 amu. One suitable PMMA is sold under the tradename DEGALAN 920 and is commercially available from Rohm Chemical.

The polymerizable composition may further comprise an effective amount of a compound that is reactive with an amine so as to liberate the organoborane so as to initiate polymerization (a disassociating agent). Desirable amine reactive compounds are those materials that can readily form reaction products with amines at or below and more preferably at room temperature so as to provide a composition that can be generally easily used and cured under ambient conditions. General classes of these compounds include acids, aldehydes, isocyanates, acid chlorides, sulphonyl chlorides, mixtures thereof and the like. Preferred amine reactive compounds are acids, especially Bronsted and Lewis acids and those described in U.S. Pat. No. 5,718,977 and, more desirably acrylic acid and methacrylic acid.

In the polymerizable composition, suitably at least 20% by weight, preferably at least 30% by weight and especially at least 40% by weight of the composition comprises the polymerizable component. Independently, the polymerizable component is suitably present at a level not exceeding 95%, preferably not exceeding 90% and especially not exceeding 85% by weight of the composition.

Suitably, the organoborane/amine complex is present at a level of at least 0.2%, preferably at least 1% and more preferably at least 2% by weight of the composition. Independently, the complex is suitably present at a level not exceeding 8%, preferably not exceeding 6% and especially not exceeding 4% by weight of the composition.

If present, the disassociating compound is present at a level of at least 1%, preferably at least 1.5% and more preferably at least 2% by weight of the composition. Independently, the disassociating compound is suitably present at a level not exceeding 8%, preferably not exceeding 6% and especially not exceeding 4% by weight of the composition.

The polymerizable composition can also include one or more stabilizers (e.g., heat and/or UV stabilizers), which may be antioxidants. When used, such heat stabilizers are typically employed in amounts that range between about 0.01% and 5% by weight of the polymerizable composition. Examples include hindered phenols, propionates, thioesters, non-phenolics, amines, phosphites, combinations thereof or the like. One preferred heat stabilizer/antioxidant is a sterically hindered phenolic antioxidant sold under the tradename ETHANOX 330, commercially available from Albemarle Corporation. Another preferred heat stabilizer/antioxidant is a Distearylthiodipropionate sold under the tradename CYANOX STDP commercially available from Cytec Specialty Chemicals. Still another preferred stabilizer is an amine/phosphate (50/50) mixture of oxidized bis(hydrogenated tallow alkyl)amines and tris(2,4-ditert-butylphenol) phosphate, which is commercially sold under the tradename IRGASTAB FS 301, commercially available from Ciba Specialty Chemicals. Advantageously, such stabilizers can assist the polymerizable composition in resistance to degradation due to heat or other conditions and may also lengthen the shelf life of the polymerizable composition.

Another particularly useful additive is an elastomeric material. The materials may improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5 percent to about 35 percent by weight, based on the total weight of the composition. Useful elastomeric modifiers include chlorinated or chlorosulphonated polyethylenes such as HYPALON 30 (commercially available from E. I. Dupont de Nemours & Co., Wilmington, Del.) and block copolymers of styrene and conjugated dienes (commercially available from Dexco Polymers under the Trademark VECTOR, and Firestone under the Trademark STEREON). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 percent of a core-shell polymer additive is desirable for achieving improved sag-slump resistance. Generally the amount of toughening polymer used is that amount which gives the desired toughness to the polymer or the adhesive prepared.

The polymerizable composition can also include plasticizer for assisting in providing desired rheology to the composition. Examples of suitable plasticizers include, without limitation, silanes, aliphatic and aromatic esters of phthalic acid, aliphatic and aromatic esters of phosphoric acid, aliphatic trimellitate esters, aliphatic esters of adipic acid, as well as stearate, sebacate and oleate esters. One particularly suitable plasticizer is an alcohol such as a phthalate (e.g., a dialkyl phthalate, a diisononyl phthalate or both). One preferred phthalate includes oxo-alcohol moieties comprised of one or all of a $C_7$ alcohol (e.g., about 30%), a $C_9$ alcohol (e.g., about 40%) and a $C_{11}$ alcohol (e.g., about 30%). An example of one suitable plasticizer is commercially available under the tradename PALATINOL® 711 P, commercially available from BASF. Preferably, although not required unless otherwise stated, the plasticizer with have a solubility in water of less than about 0.1%, more typically less than about 0.05% and still more typically less than about 0.01%.

Small amounts of inhibitors such as hydroquinone may be used, for example, to prevent or reduce degradation of the olefinic monomers during storage. Inhibitors may be added in an amount that does not materially reduce the rate of polymerization or the ultimate properties of an adhesive or other composition made therewith, typically about 10 to about 10,000 ppm based on the weight of the polymerizable monomers.

The polymerizable composition can also include one or more leveling agents. One preferred leveling agent is vinyl resin that can be a polymer composed of one, two, three or more monomers. As an example, one suitable vinyl resin is a carboxy-functional terpolymer that includes vinyl chloride, vinyl acetate and maleic acid and sold on the tradename UCAR VMCA and is commercially available from Dow Chemical, Midland, Mich.

Coupling agents may also be employed in the polymerizable composition. Exemplary coupling agents can include, without limitation, a hydroxide, an alkoxide, a silane, any combinations thereof or the like. One preferred silane is a 3-methacryloxypropyl trimethoxysilane.

When the polymerizable composition is employed as an adhesive it is preferably capable of providing a bond between a 30% glass filled polypropylene or nylon construction without the construction having been subjected to any surface treatment when tested in accordance with the procedure set out in ASTM D1002. Preferably, the adhesive provides a bond when tested under this regime including in addition being subjected to thermal cycling and high humidity. Thermal cycling in this context suitably includes cycling over a range from −40° C. to greater than 120° C. Humidity levels can vary from dry to fully saturated.

The adhesive may be used in the manner set out in International Patent Application No. PCT/US00/33806. Optionally, further components may be included as additives in the composition. Suitable additives include those set out in International Patent Application No. PCT/US00/33806.

The joints and construction formed with the composition are preferably able to withstand exposure to heat at a temperature of 100° C. and preferably up to 120° C. or more. Further, the joints and construction desirably should also be able to withstand loads applied during production and also imposed in use.

Once the adhesive has been applied, it will typically require some amount of time to cure (e.g., part cure, full cure, cure on demand, air cure, heat cure, moisture cure, chemical cure, light cure, or the like). Preferably, the adhesive cures at about room temperature (e.g., between about 20° C. to about 30° C.), but may be exposed to elevated or lowered temperatures for accelerating or slowing cure times. During cure, it may be desirable to employ fasteners (e.g., push-pins, clips or the like) for holding the constructions, structures, or both together. Such fasteners may be removable or may be intended to assist in securing the constructions and structures together during use of the panel assembly.

One preferred organoborane polymerizable composition that is in the form of a two part adhesive has a formulation in accordance with table I below:

TABLE I

| Resin Part | Wt. Percent | Hardener Part | Wt. Percent |
|---|---|---|---|
| Elastomer/MMA (30/70) | 47.44 | Elastomer/MMA (25/75) | 17.90 |
| MEHQ | 0.23 | Irgastab | 0.22 |
| Coupling Agent | 0.47 | Diisononyl Phthalate | 1.79 |
| Heat Stabilizer | 0.70 | PMMA/MMA (25/75) | 26.85 |
| Pigment | 0.05 | Core/Shell Polymer | 11.63 |
| Core/Shell Polymer | 15.22 | MMA | 32.21 |
| MMA | 21.84 | Glass Beads | 0.89 |
| Vinyl Resin/Dialkyl Pthalate (10/90) | 3.75 | Tri n-Butyl Borane/ Methoxy Propyl Amine | 8.50 |
| Methacrylic Acid | 9.36 | | |
| Glass Beads | 0.94 | | |

It should be understood that various ingredients may be substituted, added or removed from the above formulations without departing from the scope of the present invention. Moreover, it is contemplated that the weight percentages of the above ingredients may vary up to or greater than ±5%, ±10%, ±25% or ±50% of the values listed. For example, a value of 10±10% results in a range of 9 to 11.

The polymerizable composition can adhere to surfaces of metal (e.g., steel), fibers, wood, glass or other materials. However, the composition is particularly desirable for adhesion to surface of polymeric material, which can include plastics, elastomers or combinations thereof, which can be thermosets, thermoplastics or combination of the two. In a highly preferred embodiment, the polymerizable composition is employed to body to at one or more (e.g., one, two, three or more) surfaces that formed of thermoplastic (e.g., polyamide).

The composition can be bonded to plastics material that comprise a homopolymer, for example a polyolefin, a polyamide, a polyphenylene oxide and polystyrene, or a copolymer, for example a polyalkylene terephthalate. Preferred plastics materials include polypropylene, polyamide, polyamide alloys, polyethylene (low or high density), polyphenylene oxide polymers, polyphenylene oxide alloys, polystyrene polymers, polystyrene alloys, polybutylene terephthalate polymers, acrylonitrile butadiene styrene (ABS), polycarbonate acrylonitrile butadiene styrene PC/ABS, competitor grade plastics (e.g., styrene maleic anhydride (SMA) 7, blends of the above polymers with polyphenylene ether or polyphenylene oxide or the like) and polybutylene terephthalate alloys. The plastics material may contain fibre, for example short glass fibre, long glass fibre, short natural fibre or long natural fibre. Especially preferred plastics materials include short glass fibre filled polypropylene, long glass fibre filled polypropylene, short fiber glass filled ABS, long glass fiber filled ABS, short glass fiber filled PC/ABS, long glass fiber filled PC/ABS, glass filled polyamide and glass filled polyamide alloys.

In certain preferred embodiments, the polymeric materials may include fibers for additional strength. Although it is contemplated that fibers of various sizes (e.g., lengths) may be employed, advantageously, it has been found that relatively long glass fibers add a relatively high degree of strength. Thus, in preferred embodiments, a polymeric material such as ABS, PCABS, polypropylene, polyamide or another suitable plastic is filled with glass fibers having an average length of approximately greater than 2 mm, more preferably greater than about 4 mm even more preferably greater than about 6 mm and most preferably between about 8 mm and 20 mm.

The polymers or plastics may also include a variety of fillers. Exemplary fillers include, without limitation, silica, diatomaceous earth, glass, clay, talc, pigments, colorants, carbon ceramic fibers, mica, antioxidants, and the like.

It is also contemplated that the polymerizable composition can be employed to adhere to one or more surface having relatively low surface energy whether those one or more surfaces are formed of plastic, metal, glass or otherwise. In a preferred embodiment of the invention, the polymerizable composition is used to adhere to one or more surfaces (e.g., molded glass filled polypropylene and/or glass filled polyamide surfaces) having a surface energy of less than 45 mJ/m².

The polymerizable composition can be adhered to flat or planar surfaces, but has been found particularly useful for adhesion to contoured or non-planar surfaces. Contoured surfaces to which the polymerizable composition can be adhered include, without limitation, arced surface, arcuate surfaces, angled surfaces, concave surfaces, convex surfaces, intersecting surface portions, combinations thereof. The polymerizable composition has been found particularly useful for adhesion to surfaces that include a first surface portion intersecting with a second surface portion at an interface. With reference to FIG. 1, there is illustrated a surface 10 having a first surface portion 12 that intersects a second surface portion 14 at an interface 16 (shown as a line). As shown, the first surface portion 12 is disposed at an angle 20 relative to the second surface portion 14 as the first and second surface portions extend away from the interface 16. The angle 20 is typically at least about 5 degrees, although potentially more acute, more typically at least about 25 degrees and still more typically at least about 45 degrees and it typically less than about 185 degrees, although possibly more obtuse, more typically less than about 160 degrees and even more typically less than about 135 degrees (e.g., about 90 degrees).

Generally, the surfaces that are adhered together can be provided by a variety of members of a variety of articles of manufacture. Examples include members of automotive vehicle components, building components, furniture components or otherwise. The polymerizable composition has been found particularly advantageous for adhesion to surfaces of articles such as intake manifold assemblies that are formed of polyamide (e.g., nylon) or other plastics as discussed herein.

It is typically desirable for the adhesive to have desired rheological properties (e.g., viscosity, flow properties or the like). In one embodiment, the polymerizable composition is a two part adhesive having a resin part and a hardener part where, prior to combination of the resin part with the hardener part, each of the parts has its own desirable viscosity. In such an embodiment, the viscosity of the resin part is typically at least about 70,000 centipoise (cp), although possibly lower, more typically at least about 120,000 cp, even more typically at least about 200,000 cp and is also typically less than about 500,000 cp, more typically less than about 350,000 cp and still more typically less than about 260,000 cp (e.g., about 230,000 cp). Moreover, in such an embodiment, the viscosity of the hardener part is typically at least about 40,000 centipoise (cp), although possibly lower, more typically at least about 90,000 cp, even more typically at least about 125,000 cp and is also typically less than about 350,000 cp, more typically less than about 230,000 cp and still more typically less than about 165,000 cp (e.g., about 145,000 cp). These viscosity measurements are according to Brookfield, #7 spindle, 10 rpm for 2 minutes at ambient temperature (i.e., 23° C.).

Figure 6:
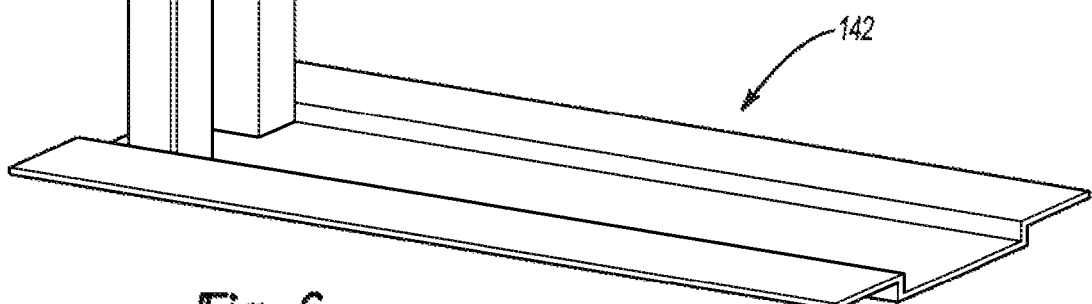
FIG. 6 is a perspective view of an exemplary test apparatus in accordance with an aspect of the present invention.

The polymerizable composition also preferably has desirable channel flow characteristic of at least about 10 cm, more typically at least about 20 cm and still more typically at least about 30 cm (e.g., about 35 cm). With reference to FIG. 6, this channel flow characteristic is measured by adjoining a first channel fixture 140 with a second channel fixture 142 such that the fixtures are at a 90 degree angle relative to each other. Preferably, the fixtures are formed of a metal (e.g., steel, aluminum, combinations thereof or the like) that are coated with electro-coat (e-coat). The channel of the first fixture 140 has a length of 12 inches, a width of 2.5 inches and a depth of ⅞ inches and the channel of the second fixture 142 has a length of 12 inches, a width of 4.75 inches and a depth of ½ inch. According to the method, the first fixture 140 is placed level and a volume of the composition is located in the first channel substantially filling a 5 and ¼ inch length portion of the channel between a stopper 146 in the channel and the interface between the first and second fixtures 140, 142. Immediately thereafter, the second fixture 142 is placed level such that the first fixture 140 extends upward and the polymerizable composition (e.g., two part adhesive that is now mixed) is allowed to flow into the channel of the second fixture 142 and the furthest distance that the composition flow along that fixture is measured.

Referring to FIGS. 2, 3, 4*a*-4*c* an article of manufacture 30 is illustrated as having a first member or component 32 with a first mating surface 34 and a second member or component 36 having a second mating surface 38. The particular 30 article shown is an intake manifold assembly 30 and will be referred to as such, however, it will be understood that the surfaces (e.g., mating surfaces) and components of the article of manufacture may be any article, unless otherwise specifically stated. Examples of other articles that have components being adhered together and which can have components adhered together in accordance with the present invention are disclosed in U.S. Pat. Nos. 6,997,515 and 6,860,010 and U.S. Patent Publication 2004/0160089, all of which are incorporated herein by reference for all purposes. Such articles include, without limitation, automotive seat back panels, automotive instrument panel structures, valve covers, or the like.

The second component 36 and, particularly, the second mating surface 38 is bonded to the first component 32 and, particularly, the first mating surface 34 with an intermediate layer of adhesive 40 that was formed from the polymerizable composition of the present invention. Either or both of the first or second mating surfaces can include one or more additional coatings, layers or components. Thus, it is contemplated that the mating surfaces of either or both of the first or second components may not necessarily be integrally formed on the components.

Optionally, either or both of the first component 32 or second component 36 has a member for facilitating joinder or location of the components relative to each other or to the engine. Referring more specifically to FIGS. 3 and 4*a*-4*c* (where like parts are denoted by like reference numerals), there are shown examples of different members. Typically, a first member 42 associated with the first component 32 will engage a second opposing structural member 44 associated with the second component 16. Such engagement can be about the periphery of a component, on an interior portion (not shown) or both. Any suitable coacting structure may be employed. For instance, a friction fit, an interference fit or some other interlock fit may be used. Examples of suitable joints include butt joints, lap joints, tongue in groove joints or the like. In one embodiment, shown in FIG. 4*a*, a snap fit connection 46 results from a tang 48 on the first member 42, engaging an opposing wall 50 formed on the second member 44. In another embodiment, in FIG. 4*b*, one of the components has a flange 52 having an inner wall surface 54 for increasing the surface area available for bonding and for engaging the other component. FIG. 4*c* is a magnified view of the joints shown in FIG. 3, and illustrates a detent 56 for achieving a snap fit and a rib 58 that penetrates a groove 60 about at least a portion of the mating surface for increasing surface area for contacting adhesive, and effectively forming a tongue-in-groove joint, snap fit or both. As will be appreciated, optionally, a tang or other like structure may be formed for assisting in achieving a snap fit or for providing an audible locator for facilitating assembly. Combinations of the above types of joints are also contemplated as possible within a single assembly. Further examples are illustrated in commonly owned U.S. Patent Application Publication 2002/0144808. Further, other suitable structures or surface treatments may be employed for providing an increase in the amount of surface area of the mating surfaces of the joint, or the overlap between the respect mating surfaces of the components.

Figure 5A:
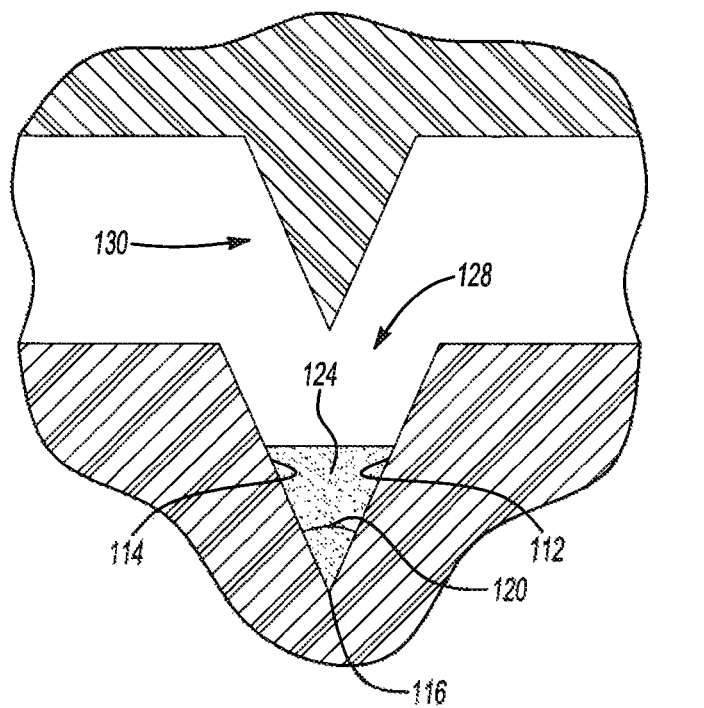
FIGS. 5A and 5B are section views of an exemplary joint being formed in accordance with an aspect of the present invention.
Figure 5B:
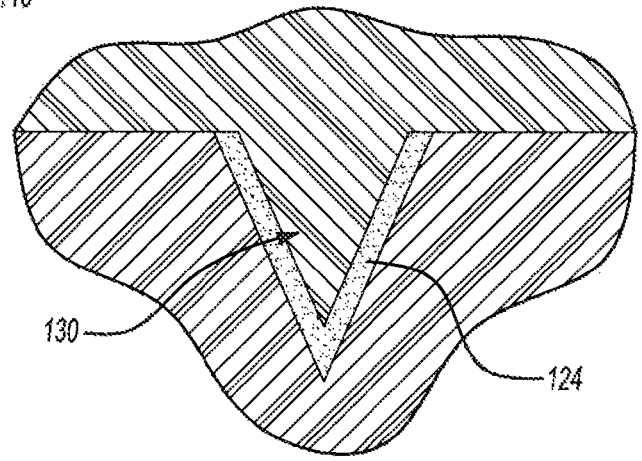

In one highly preferred embodiment, the polymerizable composition is employed for adhesion to one or more surfaces that include a first surface portion intersecting with a second surface portion at an interface with the first surface portion opposing the second surface portion and/or the first surface portion being disposed at an acute angle relative to the second surface portion. With reference to FIGS. 5A and 5B, there is illustrated a surface 110 having a first surface portion 112 that intersects a second surface portion 114 at an interface 116 (shown as a line or corner). As shown, the first surface portion 112 is disposed at an angle 120 relative to the second surface portion 114 as the first and second surface portions extend away from the interface 116. The angle 120 is typically at least about 5 degrees, although potentially more acute, more typically at least about 15 degrees and still more typically at least about 25 degrees and it typically less than about 90 degrees, although possibly more obtuse, more typically less than about 60 degrees and even more typically less than about 35 degrees (e.g., about 30 degrees). Also, the first surface portion 112 opposes the second surface portion 114.

As shown, an amount of the polymerizable composition 124 is located in the space 128 (e.g., channel) between the first surface portion 112 and the second surface portion 114 with the portions 112, 114 being defined by a first member or component of an article of manufacture (e.g., an intake manifold assembly). A protrusion 130 defined by a second member or component of the article of manufacture is then extended into the space 128 such that the polymerizable composition 124 fills a gap between the protrusion 130 and the surface portion 112, 114. Advantageously, the polymerizable composition can be formulated within the scope of the present invention to have flow properties that allow such location and movement of the polymerizable composition without significantly trapping air.

The polymerizable composition that is used as the adhesive is preferably provided over at least a portion of the surfaces to be joined, and preferably sufficiently about the periphery so that there are no appreciable gaps that result between the first and second components. In one embodiment, a bead of adhesive is placed (e.g., by pumping) on the respective mating surface of at least one of the components and the opposing mating surface is brought into contact with it. The adhesive is then cured. In another embodiment, the adhesive is precoated (e.g., by spraying, dipping, brushing, swabbing, or the like) on one or both of the mating surfaces of the respective components and then the components are joined and cured. Any other suitable joining technique may likewise be employed. Preferably the amount of adhesive employed is sufficient to achieve the desired performance characteristics of the assembly. Such amount will vary from application to application.

In one embodiment, an engine intake manifold or other article having disposed on the mating surfaces of its respective components a continuous bead or film of adhesive. As used herein continuous bead or film of adhesive means a bead or film of adhesive that is disposed around the periphery of the mating surface and the end of the adhesive bead or film connects with the beginning of the adhesive bead or film. The continuous bead or film of adhesive upon cure is capable of forming an air and liquid tight seal between the components. This function allows the adhesive bead or film to replace gaskets as the sealing means. The adhesive may be applied to the components in the immediate vicinity of the location where the components are to be contacted with each other or it may be applied in a location remote from where or when the components are to be contacted. Remote as used herein refers can refer to one or both of time and location. In the embodiment where the adhesive is applied to one or more of the components remote from the place wherein the components are joined together a cure-on-demand adhesive is used.

In a preferred embodiment of the present invention, either or both of the first or second components is fabricated from a plastic material, i.e., a thermoset material, a thermoplastic material, or a mixture thereof. Among preferred high-performance thermoplastic materials are polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6, 6, polyamide resins, syndiotactic polystyrene, and blends thereof. In a particular preferred embodiment, the material is a thermoplastic selected from polyamides, polystyrenes, polyolefins, polycarbonates, or mixtures thereof. More preferably, the material is selected from polyamides (e.g., nylon 6,6), polystyrenes or mixtures thereof. In one preferred embodiment, the material is a blend of polyamides and syndiotactic polystyrenes, and more preferably a blend of nylon 6,6 and syndiotactic polystyrene. Among useful thermoset materials are epoxy resins.

The plastics used for preparing the components typically will also include other ingredients, such as reinforcements, property modifiers (e.g., impact modifiers, flame retardants, UV protectants or the like) or other suitable fillers (e.g., chopped glass, mineral, talc, calcium carbonate, or the like). For instance, in one embodiment, the plastic is glass filled in an amount of about 10 to about 50 volume percent and more preferably about 35 volume percent. Preferably, the material selected exhibits a tensile strength of at least about 175 MPa and more preferably at least about 225 MPa, and an elongation of about 1 to about 10%, and more preferably about 3 to about 5%. The material is also thermal resistant and will withstand without degradation temperatures of at least about 135° C. (about 275° F.) and more preferably 177° C. (350° F.) for at least about 144 hours and more preferably 168 hours.

Of course, one or more of the components might be a metal (e.g., cast iron, steel, magnesium, aluminum, titanium or the like), a composite, a ceramic (e.g., a carbide, a nitride, a boronitride, or the like), or some other material. The components are preferably injection molded using conventional techniques and processing conditions. Alternatively, they may be prepared in another suitable manner, such as by compression molding, thermoforming, blow molding or the like.

Either or both of the component materials or the adhesive may be suitably treated (uniformly or locally) as desired to improve corrosion resistance, oxidation resistance, thermal resistance, or another characteristic of the final product. For instance, they might be admixed, impregnated or coated with suitable additives for achieving a desired property. In some instances, bond strengths might be enhanced by further contacting the adhesive with a suitable primer.

Surfaces to be adhered by the polymerizable composition can be surface treated, primed, coated or comprise additional layers of materials, combinations thereof, or the like. Suitable surface treatments include any of a number of techniques that alter the molecular state of a polymer in the component, a technique that bonds a material having the desired surface characteristic to a component, or a combination thereof. By way of specific example, one or any combination of a suitable corona treatment, flame spray treatment, or surface coating treatment may be employed. Suitable coatings include e-coating for metals. Suitable primers may be selected based on the poymerizable composition. In one embodiment, at least one of the components is surface treated to achieve a desired surface energy. In another embodiment, only one of the components is surface treated. Among useful primers are those based on acrylic monomers, organoboranes and/or an oxygen source (e.g. peroxides or atmospheric oxygen) as well as those based on acrylic monomers, organoborane amine complexes and/or acids. One potential primer is sold under the tradename BETAPRIME and is commercially available from Dow Chemical, Midland, Mich.

The adhesive formed of the organoborane polymerizable composition of the present invention is typically a structural adhesive and more preferably is a two part adhesive material that cures upon mixing of the first part (e.g., a resin part) with a second part (e.g., a hardener part) and that can cure at about room temperature (e.g., between about 10° C. and about 40° C. or at 23° C.). Preferably, the adhesive, after cure, can withstand the conditions of use of an engine (e.g., for an automotive vehicle) can be used. Preferably such adhesive does not decompose or delaminate at temperatures of up to about 138° C. (280° F.), more preferably up to about 143° C. (290° F.), even more preferably up to about 160° C. (320° F.) and most preferably up to about 191° C. (375° F.).

Furthermore, the adhesive is preferably able to withstand exposure to hydrocarbon materials, calcium chloride, brake fluid, glycol coolants, windshield washer solvents and the like, at the above-mentioned temperatures and the pressures to which the internal combustion engine reaches internally. In an optional embodiment, the adhesive is able to bond to other engine components, which may be metallic, ceramic, composite, plastic, or the like. The adhesive used may be curable via a variety of known mechanisms including heat cure, infrared cure, ultraviolet cure, chemical cure, radio frequency cure, solvent loss, and moisture cure.

In another embodiment the adhesive is a cure-on-demand adhesive which requires a separate operation to cause the adhesive to begin to cure. In one embodiment this is achieved by using an encapsulated curing agent which is ruptured during assembly. In another embodiment this is achieved by removing a protective coating to expose the adhesive to ambient conditions. Cure can be initiated by exposing the adhesive to heat, infrared or ultraviolet light sources, or to shearing forces and the like.

It should be recognized that the use of the term adhesive herein is not intended to foreclose primers or other bonding agents from the scope of the present invention.

The present invention offers considerable design flexibility. Though mating surfaces can be planar, they need not be. In a preferred embodiment, either or both of the mating surfaces is generally non planar (e.g., contoured, stepped, corrugated, or the like). The employment of molded plastic components also enables the formation of intricately shaped structures. In this regard, the intake manifold can have molded or otherwise fabricated in or on one of its surfaces one or more components such as brackets, connectors, cable guides, hose guides, harnesses, clips or the like. Further, conduits, ports or other like passages can be cored or machined into a molded component to enable integration of multiple components into the intake manifold assembly.

As will be appreciated by the skilled artisan, among the many advantages of the present invention are that assemblies can be made that are substantially free of a sealing gasket, mechanical fasteners or both. However, the scope of the present invention does not foreclose the use of gaskets or fasteners. Indeed, it is contemplated that a gasket might be made from (e.g., by die cutting a gasket) from the adhesive or incorporate as a component thereof (e.g. as an impregnant or coating), the adhesive of the present invention. The resulting structure seals much like a gasket would, but also exhibits the desirable mechanical characteristics of the structural adhesive.

Figure 4A:
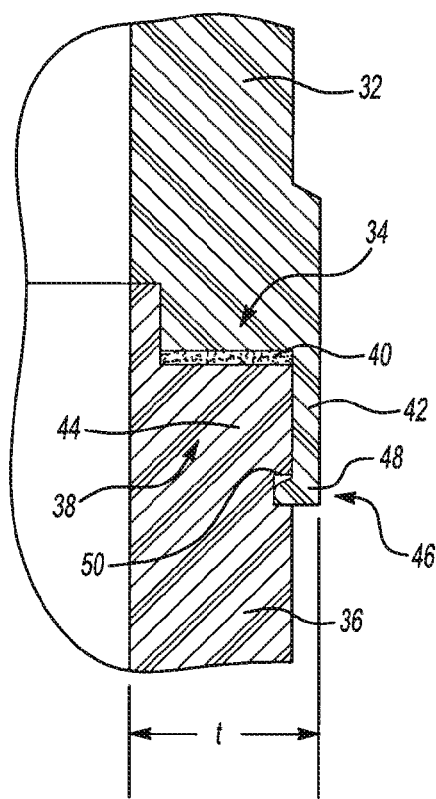
FIGS. 4A-4C are sectional views of examples of joints formed in accordance with aspects of the present invention.
Figure 4B:
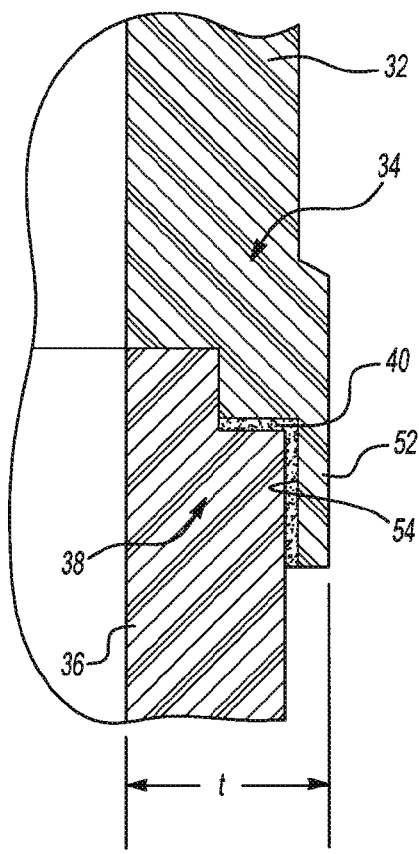
Figure 4C:
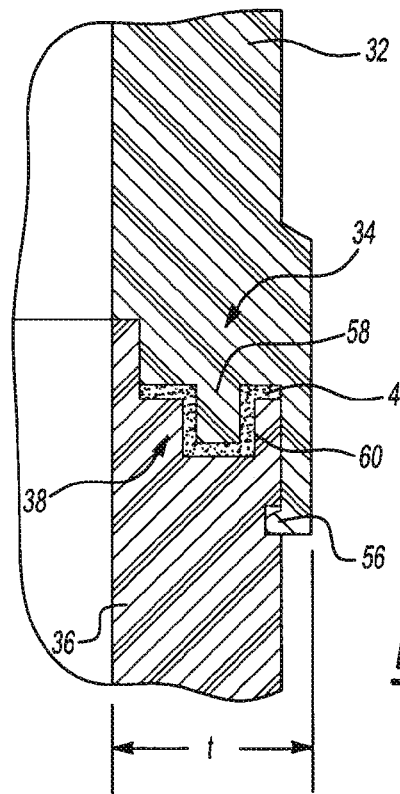

With specific reference to FIGS. 4a-4c, it can be seen that the joint has a transverse cross section thickness (t) at the joint. Though larger section thicknesses may be used and remain within the scope of the present invention, in certain highly preferred embodiments, the section thickness is less than about 7 mm, and still more preferably is less than about 5 mm (e.g., about 3 to about 4 mm). This further renders the present invention more advantageous than previous assemblies, which typically have employed larger section thicknesses.

In preparation of the present assembly, the adhesive is applied by contacting the adhesive in a conventional fashion with one or more mating surface to form a continuous bead or film. The adhesive may be coated, extruded brushed or the like onto the surface. The adhesive can be applied immediately before joining components or it can be applied in remote location from the location where the components are bonded together, or the engine.

The assembly of the present invention is preferably capable of withstanding a temperature of about 163° C. (about 325° F.) for at least about 2500, and more preferably about 3000 hours and about 177° C. (about 350° F.) for at least about 75 and more preferably about 100 hours. The assembly exhibits substantially no detectable degradation in the presence of automotive vehicle fluids, such as brake fluid, windshield washer fluid, power steering fluid, engine coolant (standard and lifetime), engine oil (standard, synthetic and sour), gasoline, diesel fuel, ethanol, methanol, starter fluids or the like.

The assembly also exhibits no detectable degradation due to exposure to environmentally encountered compounds such as calcium chloride, sodium chloride, exhaust gas (egr type) or the like. In a particularly preferred embodiment, the resulting tensile strength of the adhesive of the joint in the assembly is at least about 4000 psi (28 MPa), more preferably at least about 6500 psi (45 MPa), and still more preferably at least about 9000 psi (62 MPa). Further preferably the strength of the joint is greater than the strength of at least one, and preferably more than one, of the individual molded components. It is also preferably for the adhesive to maintain a lap shear strength according to ASTM 1002-94 of at least about 1000 psi, although possibly less, more typically at least about 1400 psi and even more typically at least 1700 or 1800 psi after 7 days of immersions in any of the following: gasoline; engine oil (5W40); brake fluid (dot 5); or power steering fluid.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A method of adhering a first mating surface to a second mating surface, the method comprising:

providing a hardener part comprising an ornanoborane/amine complex and a plasticizer selected from the group consisting of silanes, aliphatic and aromatic esters of phthalic acid, aliphatic and aromatic esters of phosphoric acid, aliphatic trimellitate esters, aliphatic esters of adipic acid, stearate, sebacate and oleate esters, having a viscosity of at least about 90,000 cp and less than about 230,000 cp and a resin part comprising one or more of monomers, oligomers or polymers having olefinic unsaturation which is capable of polymerization by free radical polymerization; and a compound which causes the said complex to disassociate so as to release the borane to initiate polymerization of one or more of monomers, oligomers or polymers having olefinic unsaturation, having a viscosity of at least about 200,000 cp and less than about 350,000 cp;

combining the resin part and the hardener part to form an adhesive polymerizable composition, and contacting the polymerizable composition with the first surface and the second surface and allowing the polymerizable composition to polymerize and bond to the first surface and the second surface thereby forming a joint between the first surface and the second surface.

2. A method as in claim 1 wherein the first surface, the second surface or both are formed of polyamide.

3. A method as in claim 1 wherein the first surface, the second surface or both is a contoured surface that includes the intersection of first surface portion and second surface portion wherein the first surface portion is disposes at an angle relative to the second portion of between about 45 degrees and about 135 degrees.

4. A method as in claim 1 wherein the polymerizable composition includes at least about 0.5% to less than about 7% polymethyl methacrylate based on the weight of the polymerizable composition upon contacting the first surface, the second surface or both.

5. A method as in claim 1 wherein the first surface is provided by a first member of an engine intake manifold assembly and the second surface is provided by a second member of an engine intake manifold assembly.

6. A method as in claim 1 wherein said first mating surface and said second mating surface are generally non-planar.

7. A method as in claim 1 wherein said joint is substantially free of a sealing gasket.

8. A method as in claim 1 wherein said joint is substantially free of mechanical fasteners.

9. A method as in claim 1 wherein the transverse cross section thickness at said joint is less than about 7 mm.

10. The method of claim 1 wherein the resin part further comprises plasticizer.

11. he method of claim 1 wherein hardener part further comprises one or more of monomers, oligomers or polymers having olefinic unsaturation which is capable of polymerization by free radical polymerization.

12. A method of claim 1 wherein the resin part exhibits a viscosity of at least about 200,000 cp and less than about 260,000 cp and the hardener part exhibits a viscosity of at least about 125,000 cp and less than about 165,000 cp.

13. A method of claim 1 wherein the plasticizer is a phthalate.

14. A method of claim 10 wherein the plasticizer is a phthalate.

15. A method of claim 4 wherein the amount of polymethyl methacrylate is at least about 2.5% to less than about 7% based on the weight of the polymerizable composition.

* * * * *

UNITED STATES PATENT AND TRADEMARK OFFICE
CERTIFICATE OF CORRECTION

| | | |
|---|---|---|
| PATENT NO. | : 7,887,668 B2 | |
| APPLICATION NO. | : 11/842577 | |
| DATED | : February 15, 2011 | |
| INVENTOR(S) | : Yee Y. Wang et al. | |

It is certified that error appears in the above-identified patent and that said Letters Patent is hereby corrected as shown below:

In Col. 18, line 1
replace "he"
with "The."

Signed and Sealed this
Twenty-ninth Day of March, 2011

David J. Kappos
*Director of the United States Patent and Trademark Office*